United States Patent [19]

Angerer et al.

[11] Patent Number: 5,290,829
[45] Date of Patent: Mar. 1, 1994

[54] PERFLUORINATED ALKYL HYDROPHOBE HYDROXYALKYLCELLULOSE ASSOCIATIVE THICKENERS

[75] Inventors: John D. Angerer, Hockessin, Del.; Thomas G. Majewicz, Kennett Square, Pa.; Makram H. Meshreki, Wilmington, Del.

[73] Assignee: Aqualon Company, Wilmington, Del.

[21] Appl. No.: 862,416

[22] Filed: Apr. 2, 1992

[51] Int. Cl.$^5$ .............. C08B 11/06; C08B 11/08; C08B 11/14; C08J 3/05
[52] U.S. Cl. .............. 524/31; 536/84; 536/85; 536/87; 536/95; 536/96
[58] Field of Search .............. 536/84, 85, 87, 95, 536/96; 524/31

[56] References Cited

U.S. PATENT DOCUMENTS

| | | | |
|---|---|---|---|
| 4,228,277 | 10/1980 | Landoll | 536/902 |
| 4,267,302 | 5/1981 | Ohmori | 528/103 |
| 4,664,978 | 5/1987 | Wu et al. | 428/409 |
| 4,870,167 | 9/1989 | Zody et al. | 536/114 |

FOREIGN PATENT DOCUMENTS 2636334  9/1988  France .............. C08B 37

OTHER PUBLICATIONS

D. J. Stewart, D. R. Purvis & C. R. Lowe, Journal of Chromatography, 510 (1990) 177-187, "Affinity Chromatography on Novel Perfluorocarbon Supports".

*Primary Examiner*—John Kight, III
*Assistant Examiner*—Jeffrey Culpeper Mullis
*Attorney, Agent, or Firm*—David Edwards

[57] ABSTRACT

A purified hydroxyethylcellulose (HEC) or hydroxypropylcellulose (HPC) reacts with a perfluorinated alkyl glycidyl ether to produce an associative thickener wherein a fluorinated $C_8$ chain is nearly as effective as a hydrocarbyl $C_{16}$ straight chain hydrophobe. A preferred glycidyl ether is prepared by reacting a terminal hydroxyl of a perfluorinated surfactant with epichlorohydrin.

13 Claims, No Drawings

PERFLUORINATED ALKYL HYDROPHOBE HYDROXYALKYLCELLULOSE ASSOCIATIVE THICKENERS

FIELD OF THE INVENTION

The invention relates to hydrophobically modified polymers which thicken aqueous systems. In particular the invention relates to cellulose ethers hydrophobically modified with perfluorinated alkyl hydrophobes.

BACKGROUND OF THE INVENTION

Landoll, U.S. Pat. No. 4,228,277, introduced a pioneering class of hydrophobically modified cellulose ethers which have gained a class recognition as associative cellulosic thickeners. Assignee's pending patent application, Ser. No. 428,912, filed Oct. 30, 1989, details how improved properties are obtained when the alkyl hydrophobes, as taught by Landoll, are replaced with arylalkyl hydrophobes such as nonylphenyl groups. U.S. Pat. No. 4,870,167 discloses that hydrophobically modified nonionic polygalactomannan ethers (guar) can be employed in a variety of uses including oil drilling and recovery. U.S. Pat. No. 4,664,978 discloses a fluorinated product of either methylcellulose or ethylcellulose. A hydrophilic polymeric coating comprising polyvinyl alcohol esterified with perfluorooctanoyl chloride was disclosed in a publication by Stewart, David J.; Purvis, Duncan R.; Lowe, Christopher R. (Inst. Biotechnol., Univ. Cambridge, Cambridge, U.K. CB2 3EF) *J. Chromatogr.* 1990, 510, 177–187. French Patent Application 2 636 334, "*Perfluoroalkylated Polysaccharides, Their Preparation and Uses*" discloses grafting 4 to 20 carbon atom perfluoroalkyl groups onto polysaccharide chains of xanthan and carboxymethylcellulose.

While these references indicate that extensive and exhaustive work has been undertaken on polymer modification, it remained for the present invention to reduce to practice the means for providing a new and useful associative thickener 5 utilizing a perfluorinated alkyl hydrophobe.

SUMMARY OF THE INVENTION

It is an object of the invention to provide a new class of associative thickeners consisting of perfluorinated alkyl hydrophobe modified cellulose ethers selected from hydroxyethylcellulose and hydroxypropylcellulose.

A preferred process for producing a perfluorinated alkyl hydroxyethylcellulose comprises the steps:
(1) removing impurities to produce a high purity hydroxyethylcellulose;
(2) preparing a perfluoroalkyl glycidyl ether in the presence of a phase transfer catalyst; and
(3) reacting the purified hydroxyethylcellulose with the perfluoroalkyl glycidyl ether in the presence of an alkali metal hydroxide to produce a perfluoroalkyl hydroxyethylcellulose.

DETAILED OF THE INVENTION

It is well known that fluorocarbons possess substantial hydrophobic character and such moieties have been incorporated into products to impart oil and water repellency, low surface energy, low solubility in hydrocarbons, lubricity, and release. Perfluoroalkyl moieties have also been used in a variety of specialty chemicals to increase thermal and chemical stability or to control compatibility with aqueous and non-aqueous media.

More recently, complexes of anionic polysaccharides with cationic perfluoroalkyl surfactants and perfluoroalkylated xanthan gum and methylcelluloses have been disclosed.

It has been discovered that hydroxyethylcellulose (HEC) and hydroxypropylcellulose (HPC) can be reacted with a suitable glycidyl ether to produce associative thickeners with perfluorinated alkyl hydrophobes. HEC and HPC starting materials are available from the Aqualon Company as well as Union Carbide, Nippon Soda and Hoechst.

Several novel perfluoroalkyl glycidyl ethers were synthesized by alkylating the terminal hydroxyl group of a perfluoroalkanol surfactant with epichlorohydrin, using classical synthetic methods described in U.S. Pat. Nos. 4,267,302, 3,102,912, and 4,709,074. Examples synthesized included the following structures:

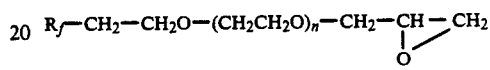

n = 0, 5–6 or 9–10
$R_f = F(CF_2)_y$ where y = 7–8

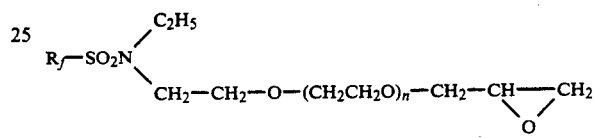

n = 0 or 12–13
$R_f = F(CF_2)_y$ where y = 7–8

High yields of glycidyl ether were obtained only from 3M's Fluorad ™ FC-10 perfluoroalkanol. Phase transfer catalysis (PTC) produced yields up to 98%.

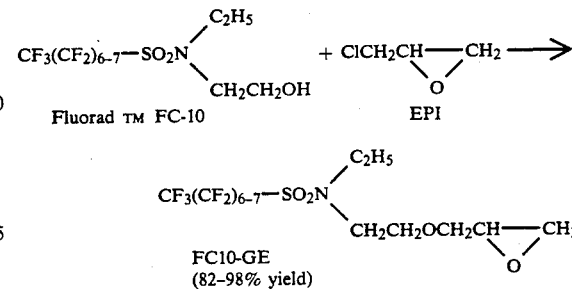

Fluorad ™ FC-10    EPI

FC10-GE
(82–98% yield)

The polyoxyethylated homolog, 3M's Fluorad ™ FC-170-C, containing 12–13 oxyethylene units, gave low yields of 23–38%. NMR analysis showed the remainder was largely unreacted perfluoroalkanol.

Both DuPont's Zonyl ® BA and the polyoxyethylated homolog, Zonyl ® FSN 100 and FSO 100, gave low yields of the glycidyl ethers, but for different reasons. NMR analysis revealed the Zonyl ® BA glycidyl ether is very sensitive to hydrolysis under alkaline conditions. The glycol ether hydrolysis product was actually the major product from either a one-step alkaline PTC process or two-step $BF_3/Et_2O$ caustic process. A one-step caustic catalyzed process produced the highest yield, 48% glycidyl ether, with the balance being, again, mostly hydrolysis product. The Zonyl ® FSN 100 and FSO 100, like the Fluorad ® FC-170-C, gave low yields because of poor reactivity with epichlorohydrin under the chosen reaction conditions.

The glycidyl ether of 3M's Fluorad ™ FC-10 perfluorooctane sulfonamidealkanol (FC10-GE) reacts reasonably well at ~15% reaction efficiency with purified HEC to give an associative cellulosic thickener bearing perfluorocarbyl hydrophobes. Reaction efficiency markedly decreases to ≦5% upon reacting with unpurified HEC. Klucel® HPC (Aqualon Company) also reacts with this glycidyl ether to give an associative product, but the reaction efficiency appeared to be much lower than for HEC. Low MS HP-Guar, HE-Guar, and HE-Starch did not react with FC10-GE under the same conditions.

A preferred associative thickener product is the reaction product of hydroxyethylcellulose with the glycidyl either of N-ethyl-N-2-hydroxyethyl perfluorooctanesulfonamide. This product (FC10-HEC) gave excellent performance as a latex paint thickener.

Solution rheology data suggest that fluorocarbyl hydrophobes are far more efficient than hydrocarbyl analogs for promoting polymer chain association. The $C_8F_{17}$ hydrophobe on FC10-HEC produces solution rheology more typical of a $C_{16}H_{33}$ group than a $C_8H_{17}$ group.

The invention has industrial applicability for the production of a glycidyl ether intermediate and a new class of perfluorinated HEC and HPC associative thickeners. The following procedures and examples illustrate the practice of the invention without being limiting.

General Synthesis Methods for Perfluoroalkyl Glycidyl Ethers

Procedure A

Phase Transfer Catalysis (PTC) Method

A mixture of 50/50 w/w percent aqueous sodium hydroxide solution (0.3 mole), epichlorohydrin (0.25 mole) and tetrabutylammonium hydrogen sulfate (2.0 g) was stirred in a 250 ml round bottom flask. The perfluoroalkanol (0.05 mole) was added gradually during 30 minutes with cooling so that the temperature did not exceed 25° C. After 24 hours the reaction mixture was poured into water (50ml) and the mixture was extracted with ethylene dichloride (3×250 ml). The organic phase was washed with brine (3×150 ml) to neutrality, dried over sodium sulfate, filtered, evaporated to dryness and rectified with water under vacuum to remove residual epichlorohydrin. The assay of perfluoroalkyl glycidyl ether was determined by $^{13}$C-NMR. Residual epichlorohydrin was determined by GC.

Procedure B

Sodium Hydroxide Method

A mixture of 0.1 mole of perfluoroalkanol and 0.33 mole of epichlorohydrin and a trace amount of water (1.12 g) in a 250 ml three neck round bottom flask, equipped with a thermometer, mechanical stirrer, and a condenser was heated to 80° C. Sodium hydroxide pellets (0.1 mole) were added slowly over a period of 1 hour so that the temperature did not exceed 80° C. The reaction mixture was then heated to 95° C. and reacted for 4-6 hours. Water (50 ml) was added to the cold reaction mixture which was then extracted with ethylene dichloride (3×250 ml). The organic phase was washed with brine, dried and distilled. Purity was determined by $^{13}$C-NMR and GC.

Procedure C

Boron Trifluoride Etherate Method

A mixture of 0.1 mole of perfluoroalkanol and 0.01 mole of boron trifluoride etherate in a 250 ml round bottom flask equipped with a thermometer, mechanical stirrer, condenser, and an addition funnel was heated to 60° C. Epichlorohydrin (0.12 mole) was added over a period of 4 hours and then the reaction mixture was heated to 80° C. Aqueous sodium hydroxide solution (0.12 moles) was added over a period of 1 hour and held at 80° C. for an additional 1 hour. The reaction was cooled and 50 ml water was added. The mixture was extracted with ethylene dichloride (3×250 ml) and the organic layer was washed with brine, dried, evaporated and distilled. Purity was determined by $^{13}$C-NMR and GC.

Examples 1-20

Synthesis and Properties of Perfluoroalkyl Hydrophobically-Modified Polysaccharides The reaction of FC10-GE with purified hydroxyethylcellulose is exemplified in Table 1 (Examples 1-12). A 2 quart Chemco stirred autoclave was charged with 81.0 g HEC and 1000 ml t-butyl alcohol. The reactor was sealed and degassed with nitrogen (pressure/vacuum). Caustic solution, 8.2 g sodium hydroxide/100 ml water, was then added via a syringe to the stirred slurry. The charge was degassed again with nitrogen (pressure/vacuum). Caustic solution, 8.2 g sodium hydroxide/100 ml water, was then added via a syringe to the stirred slurry. The charge was degassed again with nitrogen, pressurized to 5 psig, and held at 18°-23° C. for 30 minute, FC10 glycidyl ether (10 g) dissolved in 20 ml t-butyl alcohol was added. The reactor was pressurized and heated up to 100° C. and the temperature was held for 5 hours. The reactor was then cooled to <40° C., and neutralized with acetic acid to a slurry pH of ~7-8. The charge was purified in 85% acetone, followed by dehydration in 99+% acetone, and drying in a fluid bed dryer at 70° C. Grinding completed the processing. Synthesis and analytical data are given in Table 1. Reasonable reaction

TABLE 1

FC10-HEC
SYNTHESIS BY REACTION OF FC10-GE WITH PURIFIED HEC

| Example | $H_2O$/HEC[d] | NaOH/HEC[d] | GE/HEC[d] | Reaction Time (hrs.) | Reaction Temp. (°C.) | Fluorine in Product (%) | Hydrophobe DS | GE[c] Rxn Eff | 1% BF Visc. 30 rpm | 1% BF Visc. 60 rpm | Ash % |
|---------|---------------|-------------|-----------|----------------------|----------------------|-------------------------|---------------|---------------|---------------------|---------------------|-------|
| 1[a]    | 0.78          | 0.035       | 0.09      | 5.5                  | 90                   | 0.88                    | 0.011         | 19            | 1000                | —                   | 3.17  |
| 2[a]    | 0.78          | 0.035       | 0.09      | 4.5                  | 90                   | 0.62                    | 0.007         | 13            | 140                 | —                   | —     |
| 3[a]    | 0.78          | 0.035       | 0.09      | 6.5                  | 100                  | —                       | —             | —             | 1100                | —                   | 3.81  |
| 4[a]    | 0.39          | 0.034       | 0.09      | 5.5                  | 90                   | —                       | —             | —             | 3600                | —                   | 2.57  |
| 5[a]    | 0.63          | 0.060       | 0.06      | 5.0                  | 110                  | —                       | —             | —             | 4120                | —                   | 2.18  |
| 6[a]    | 0.63          | 0.060       | 0.03      | 5.0                  | 110                  | —                       | —             | —             | 44                  | —                   | 2.63  |
| 7[a]    | 1.23          | 0.100       | 0.09      | 5.0                  | 100                  | 0.68                    | 0.008         | 16            | 510                 | 1700                | 4.05  |
| 8[b]    | 1.23          | 0.100       | 0.06      | 5.0                  | 100                  | 0.388                   | 0.005         | 15            | 100                 | 100                 | 3.08  |
| 9[b]    | 1.23          | 0.100       | 0.03      | 5.0                  | 100                  | 0.2                     | 0.002         | 15            | 40                  | 40                  | 7.66  |
| 10[b]   | 1.23          | 0.100       | 0.12      | 5.0                  | 100                  | 1.08                    | 0.012         | 14            | 2950                | 7000                | 2.42  |

TABLE 1-continued

FC10-HEC
SYNTHESIS BY REACTION OF FC10-GE WITH PURIFIED HEC

| Example | H$_2$O/HEC[d] | NaOH/HEC[d] | GE/HEC[d] | Reaction Time (hrs.) | Reaction Temp. (°C.) | Fluorine in Product (%) | Hydrophobe DS | GE[c] Rxn Eff | 1% BF Visc. 30 rpm | 1% BF Visc. 60 rpm | Ash % |
|---|---|---|---|---|---|---|---|---|---|---|---|
| 11[b] | 1.23 | 0.100 | 0.25 | 5.0 | 100 | 1.57 | 0.017 | 12 | 2100 | 4300 | 6.01 |
| 12[b] | 1.23 | 0.100 | 0.37 | 5.0 | 100 | 2.33 | 0.026 | 13 | 5 | 5 | 3.61 |

[a] HEC, 1% Brookfield (BF) Viscosity of 34 cps, HE-MS = 4.7; Ash = 4.18%
[b] HEC, 1% Brookfield (BF) Viscosity of 52 cps, HE-MS = 4.01; Ash = 4.46%
[c] Based on total amount of glycidyl ether added.
[d] Weight Ratios efficiencies and rates of reaction were achieved. Products ranged in hydrophobe DS values of 0.002 to 0.026. Products were completely soluble in water and exhibited classical associative behavior, i.e., viscosity increased as hydrophobe level increased. Reaction to a DS level of 0.026 produced a water-insoluble, but aqueous ethanol-soluble product. Its solubility in aqueous ethanol indicates that water insolubility is the result of excess hydrophobe substitution. This behavior is also typical of an alkyl group-containing associative cellulosic polymer.

The viscosity data show FC10-HEC to be an associative polymer and suggest that the fluorocarbyl radical is much more effective than the hydrocarbyl analog for promoting association. The hydrophobe on FC10-HEC is $C_{7-8}F_{15-17}$ (neglecting any contribution of the short ethyl sulfonamide connecting group to associative properties); therefore, it can be compared to $C_8H_{17}$, the hydrocarbyl analog.

EXAMPLES 13-20

Reactions on HPC (HP Guar, HE Guar, and HE Starch) were conducted in a similar manner. Synthesis and analytical data are given in Table 2.

EXAMPLE 21

Two-Stage Reaction Procedure for Modified HEC

A 2 quart Chemco stirred autoclave was charged with 81.0 g Rayonex F (dry weight) and 1200 ml t-butyl alcohol. The reactor was sealed and degassed with nitrogen (pressure/vacuum). Caustic solution, 25.0 g sodium hydroxide/100 ml water, was then added via a syringe to the stirred slurry. The charge was degassed again with nitrogen, pressurized to 5 psig, and held at 20°-25° C. for 30 minutes. After the A/C period, 37.0 g ethylene oxide was added and the reactor was heated to 80° C. and temperature maintained for 1 hour. The reactor was cooled to <40° C. and 43.5 g 70% nitric acid was added. Additional ethylene oxide (69.0 g) was then added along with 10 g of FC10-GE dissolved in 20 ml t-butyl alcohol. The reactor was then heated to 95° C., temperature maintained for 1 hour, then heated to 110°-115° C., and the temperature maintained for 3 hours. The reaction was then cooled to <40° C. and neutralized with acetic acid to a slurry pH of ~7-8. The charge was purified in 85% acetone, followed by dehydration in 99+% acetone, drying in a Lab-Line fluid bed dryer, and grinding. The hydroxyethyl Molar Substitution (M.S.) was 3.6 and hydrophobe Degree of Substitution (D.S.) was 0.002.

EXAMPLES 22-32

Evaluation of FC10-HEC in Latex Paints

Samples of FC10-HEC were tested as an associative

TABLE 2

OTHER POLYSACCHARIDES MODIFIED WITH FC10 GLYCIDYL ETHER[a]

| Examples | Polysaccharide | GE/Polysaccharide | Fluorine in Product (%) | Ash (%) | Hydrophobe (D.S.) | BF 1% Viscosity (cps) | HE or HP MS |
|---|---|---|---|---|---|---|---|
| 13 | HP-Guar | 0.061 | 0.0159 | 15.21 | <0.001 | 640 | 0.08 |
| 14 | HP-Guar | 0.123 | 0.0307 | 9.89 | <0.001 | 330 | 0.21 |
| 15 | HE-Guar | 0.061 | 0.0144 | 9.79 | <0.001 | 340 | 0.56 |
| 16 | Klucel ® GF[b] | 0.061 | 0.2300 | 0.39 | 0.0030 | 76 | 4.07 |
| 17 | Klucel ® GF[b] | 0.123 | 0.5810 | 4.70 | 0.0070 | 140 | 3.15 |
| 18 | Klucel ® GF[b] | 0.246 | 1.0200 | 1.53 | 0.0130 | 480 | 3.71 |
| 19 | HE-Starch | 0.061 | — | — | — | 5 | — |
| 20 | HE-Starch | 0.123 | 0.0100 | 9.03 | <0.001 | 5 | 0.06 |

[a] H$_2$O/Polysaccharide weight ratio = 1.23; NaOH/Polysaccharide weight ratio = 0.1; Reaction time = 5 hours; Reaction temperature = 100° C.
[b] HPC available from Aqualon Company.

thickener in latex paint. Performance was equal to or better than other HMHEC hydrocarbyl compositions, particularly as a function of the level of hydrophobe substitution. Table 3 contains results for both a flat and semigloss formula.

TABLE 3

Paint Evaluations: FC10-HECs

Polyco 2161 Standard Flat Paint Formula

| Example | HMHEC Polymer | FC10(DS) | KU | Weight Thickener % | ICI | Leveling | Sag | Spatter |
|---|---|---|---|---|---|---|---|---|
| 21 | 21 | 0.002 | 95/100 | 1.13 | 1.4 | 3 | 21 | 6 |
| 22 | 9 | 0.002 | 94/99 | 1.04 | 1.3 | 3 | 19 | 6 |
| 23 | 8 | 0.005 | 95/100 | 0.82 | 1.4 | 3 | 19 | 7 |
| 24 | 2 | 0.007 | 96/100 | 0.73 | 1.6 | 4 | 16 | 9 |

TABLE 3-continued

| Paint Evaluations: FC10-HECs | | | | | | | | |
|---|---|---|---|---|---|---|---|---|
| 25 | 7 | 0.008 | 93/97 | 0.65 | 1.2 | 3 | 17 | 4 |
| 26 | 1 | 0.011 | 95/99 | 0.6 | 1.3 | 4 | 14 | 9 |
| 27 | Plus 330[(1)] | — | 93/98 | 0.65 | 1.2 | 3 | 18 | 8 |

| | | | | Rhoplex AC-417 Standard Semigloss Formula | | | | |
|---|---|---|---|---|---|---|---|---|
| Paint Designation | HMHEC Polymer | FC10(DS) | KU | Weight Thickener % | ICI | Leveling | Sag | Spatter | Gloss-60° |
| 28 | 9 | 0.002 | 91/102 | 0.58 | 1.6 | 5 | 24+ | 6 | 45.8 |
| 29 | 8 | 0.005 | 90/104 | 0.44 | 1.4 | 4 | 24+ | 7 | 44.8 |
| 30 | 2 | 0.007 | 92/108 | 0.36 | 1.3 | 8 | 14 | 9 | 44.4 |
| 31 | 1 | 0.011 | 91/102 | 0.36 | 1.2 | 4 | 18 | 8 | 37.9 |
| 32 | Plus 330[(1)] | — | 89/100 | 0.36 | 1.1 | 6 | 16 | 9 | 43.2 |

[(1)] Aqualon Natrosol ® Plus 330 hydrophobically modified hydroxyethylcellulose

What is claimed is:

1. An aqueous phase associative thickener, characterized in that the associative thickener is a hydroxyethylcellulose or hydroxypropylcellulose hydrophobically modified with a perfluorinated alkyl hydrophobe glycidyl ether having the following structure

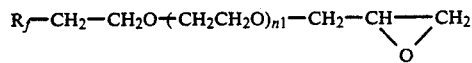

or

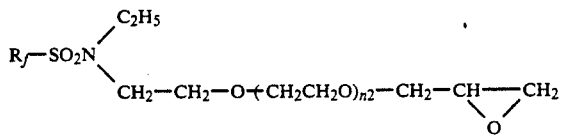

where $n_1$ is selected from the group consisting of 0, 5-6 or 9-10, $n_2$ is selected from the group consisting of 0 or 12-13 and $R_f$ is selected from the group consisting of $F(CF_2)_y$ where y is 7-8.

2. The associative thickener of claim 1 where the perfluorinated hydrophobe portion of the perfluorinated glycidyl ether contains from 8 to 12 carbon atoms.

3. The associative thickener of claim 2 where hydroxyethylcellulose has a hydroxyethyl Molar Substitution (M.S.) of 2 to 5.

4. The associative thickener of claim 2 where hydroxypropylcellulose has a hydroxypropyl Molar Substitution (M.S.) of 2 to 5.

5. A process for preparing a perfluorinated alkyl hydroxyalkylcellulose for use as an aqueous phase associative thickener comprising the steps:

(1) removing impurities to produce a high purity hydroxyalkylcellulose;

(2) preparing a perfluorinated alkyl glycidyl ether; and (3) reacting the purified hydroxyalkylcellulose with the glycidyl either to produce a perfluorinated alkyl hydroxyalkylcellulose, said perfluorinated glycidyl ether having the structure

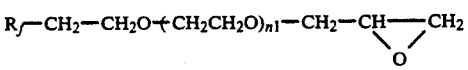

or

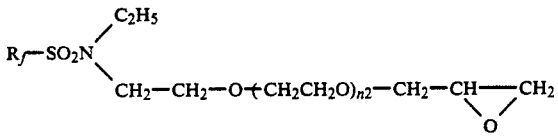

where $n_1$ is selected from the group consisting of 0, 5-6 or 9-10, $n_2$ is selected from the group consisting of 0 or 12-13 and $R_f$ is selected from the group consisting of $F(CF_2)_y$ where y is 7-8.

6. The process of claim 5 where the glycidyl ether is N-ethyl-N-2-hydroxyethyl perfluorooctanesulfonamide.

7. The process of claim 5 where the hydroxyalkylcellulose is hydroxyethylcellulose.

8. The process of claim 7 where the hydroxyethylcellulose has an HE M.S. of 2 to 5.

9. The process of claim 5 where the hydroxyalkylcellulose is hydroxypropylcellulose with an HP M.S. of 2 to 5.

10. The process of claim 5 where in step (2) the glycidyl ether is prepared by reacting a terminal hydroxyl group of a $C_7$ to $C_{14}$ perfluoroalkanol surfactant with epichlorohydrin in the presence of a phase transfer catalyst.

11. The process of claim 10 where the perfluoroalkanol surfactant comprises 7-8 perfluoro carbon atoms.

12. An aqueous coating composition containing a thickening amount of the reaction product of purified hydroxyethylcellulose with the glycidyl ether of N-ethyl-N-2-hydroxyethyl perfluoroctanesulfonamide.

13. The aqueous coating composition of claim 12 further comprising a pigment and a latex binder.

* * * * *

UNITED STATES PATENT AND TRADEMARK OFFICE
CERTIFICATE OF CORRECTION

PATENT NO. : 5,290,829

DATED : March 1, 1994

INVENTOR(S) : J. D. Angerer, T. J. Podlas & M. H. Meshreki

It is certified that error appears in the above-identified patent and that said Letters Patent is hereby corrected as shown below:

Column 7, line 61 "either"

should read -- ether --

Signed and Sealed this

Ninth Day of August, 1994

Attest:

BRUCE LEHMAN

Attesting Officer

Commissioner of Patents and Trademarks